United States Patent
Fontaine (12)

(10) Patent No.: US 6,378,583 B1
(45) Date of Patent: Apr. 30, 2002

(54) HEEL AND TOE WEAR BALANCING

(75) Inventor: Jean François Léon Fontaine, Burden (LU)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 09/514,780

(22) Filed: Feb. 28, 2000

(51) Int. Cl.[7] .................. B60C 11/11; B60C 11/12; B60C 107/00; B60C 115/00
(52) U.S. Cl. .................. 152/209.18; 152/209.21; 152/209.22; 152/209.28
(58) Field of Search ................. 152/209.18, 209.21, 152/209.22, 209.28, 902, DIG. 3

(56) References Cited

U.S. PATENT DOCUMENTS

| D81,592 S | 7/1930 | Nesmith |
| 2,505,137 A | 4/1950 | Nellen |
| 3,512,567 A | 5/1970 | Verdier |
| 3,998,256 A | 12/1976 | Verdier |
| 4,122,879 A | 10/1978 | Takigawa et al. |
| 4,667,717 A | * 5/1987 | Graas ............... 152/209.28 |
| 4,796,683 A | 1/1989 | Kawabata et al. |
| D309,442 S | 7/1990 | Okada |
| 5,031,680 A | 7/1991 | Kajikawa et al. |
| 5,088,536 A | 2/1992 | Graas et al. |
| D335,111 S | 4/1993 | Lurois |
| 5,343,914 A | 9/1994 | Wako |
| 5,435,366 A | 7/1995 | Voigt et al. |
| 5,454,411 A | 10/1995 | Weyrich et al. |
| 5,538,060 A | 7/1996 | van der Meer et al. |
| D377,329 S | 1/1997 | Hamamoto et al. |
| 5,603,366 A | 2/1997 | Nakayama et al. |
| D388,039 S | 12/1997 | Ratliff, Jr. |
| 5,891,276 A | 4/1999 | Takahashi |
| 6,000,450 A | 12/1999 | Kishimoto et al. |
| 6,003,574 A | * 12/1999 | Boiocchi et al. ....... 152/DIG. 3 |

FOREIGN PATENT DOCUMENTS

| EP | 0342908 | 11/1989 |
| EP | 0354718 | 2/1990 |
| EP | 0652119 | 5/1995 |
| EP | 0847878 | 6/1998 |
| EP | 0849101 | 3/1999 |
| EP | 0917970 | 5/1999 |
| JP | 63-149204 | * 6/1988 |
| JP | 1-275203 | * 11/1989 |
| JP | 02-102802 | 4/1990 |
| JP | 02-182502 | 7/1990 |
| JP | 4-274907 | * 9/1992 |
| JP | 6-305307 | * 1/1994 |
| JP | 8-318708 | * 12/1996 |
| JP | 10-904 | * 1/1998 |
| JP | 11-334319 | * 12/1999 |

* cited by examiner

Primary Examiner—Steven D. Maki
(74) Attorney, Agent, or Firm—Howard M. Cohn

(57) ABSTRACT

The present invention relates to an improvement to block-type tread patterns for pneumatic tires (110,210). To balance heel-toe wear, the heels (126,226) of one or more of the blocks are provided with one or more notches (130,230). The application of an appropriate number, shape, and size of notches provides the blocks with a variable net to gross where the void space decreases from the heel to the toe. With increased void space, the wear rate of the heel is increased to balance the wear rate at the toe.

11 Claims, 2 Drawing Sheets

HEEL AND TOE WEAR BALANCING

TECHNICAL FIELD

The present invention generally relates to tread patterns for pneumatic tires, particularly to a variation of block tread patterns designed to balance the rate of wear between the leading edge or heel and the trailing edge or toe of the tread blocks.

BACKGROUND OF THE INVENTION

A pneumatic tire includes a ground contacting portion or tread, the tread having a pattern designed to provide the tire with a desirable combination of traction, durability, ride comfort and quiet operation. It is also desirable that the tread pattern provide the tire with an all-weather capability, that is a set of characteristics providing adequate performance under a variety of adverse road conditions including snowing, freezing, raining, etc.

Tire tread patterns designed for traction on wet surfaces, snow and ice often feature a block type tread pattern. A block type tread pattern is characterized by a plurality of main grooves extending in a circumferential direction and a number of lateral grooves extending in a more or less axial direction. The areas of tread between the circumferential and lateral grooves are referred to a tread blocks. Tread blocks may also be defined by the edges of the tread and by grooves having other orientations. In comparison, rib-type tread patterns are characterized primarily by circumferential grooves separating circumferentially continuous ribs. Tread designs may also combine rib and block patterns.

The use of blocks as elements of a tread pattern tends to increase the level of noise generated by such tires as compared to rib-type tires. Also, as noted by U.S. Pat. No. 5,538,060, such blocks have a tendency towards irregular wear due primarily to their lack of stiffness in the circumferential direction of the tread.

It is known in pneumatic tires having a block tread pattern that normal operation of the tire produces uneven wear of the tread blocks called heel-and-toe wear. In heel-and-toe wear, the rate of wear at the toe or trailing edge of the blocks exceeds the rate of wear at the heel or leading edge of the blocks. In normal operation, the heel of each block strikes the pavement first followed by the toe. Similarly the heel of each block is lifted first from its contact with the pavement followed by the toe. In addition to reduced tread life, heel-and-toe wear increases the level of noise generated by the operation of the fire. Also, the cornering and braking performance of a tire with heel-and-toe wear may be degraded.

U.S. Pat. No. 5,891,276 discloses a variation of the block tread pattern designed to suppress heel-and-toe wear wherein a narrow block is provided outside each block, the narrow block having a surface formed to be a circular arc by setting both end parts of the narrow block to be lower than he adjacent tread block by 1.5 to 2.5 mm.

Several design patents, for example U.S. Des. 335,111 and U.S. Des 309,442 provide example of block tread patterns featuring a notch or groove in the toe area of some tread blocks. As taught by U.S. Pat. No. 4,122,879 ('879), heel-and-toe wear is severely affected by the configuration of the lateral grooves, particularly the configuration of the grooves defining the blocks in the vicinity of the edges of the tread and more particularly to the angle of the walls of the lateral grooves relative to the equatorial line. Patent '879 discloses a design to mitigate heel-and-toe wear by providing the walls of lateral grooves with an angle of from 20 to 40 degrees relative to the central axis of the lateral grooves.

Despite recognition of the problem of heel-and-toe wear and various solutions described by the prior art, there remains an opportunity for tread pattern designs to mitigate heel-and-toe wear problems in block-type tread patterns and to provide fires with a balance of traction, durability and noise generation characteristics suitable to variety of vehicles and road conditions.

SUMMARY OF THE INVENTION

The present invention to provides an improvement that is generally applicable to the design of block tread patterns for pneumatic tires and particularly applicable to directional block tread patterns having the capability of balancing heel-and-toe wear.

To balance the rate of heel and toe wear, the leading edge or heel of one or more blocks are provided with one or more notches, the notches having a variable width in the axial direction, the width generally decreasing from a maximum at the heel to a minimum in the direction of the toe. Said notches provide the tread blocks with a variable net to gross where the net to gross increases from the heel to the toe of the blocks.

The variation of net to gross from the heel to the toe of a block can be provided by a wide range in the number shape and dimensions of the notches that can be applied to the toes of a blocks. For example the notches may be rectangular, triangular, trapezoidal or curved in shape. The notches may also have variable depth, having a maximum depth at the heel of the block.

According to the invention, a pneumatic tire has a directional tread with blocks. Each block has a leading edge or heel and a trailing edge or toe extending from a ground contacting tread surface. One or more of the blocks is characterized by one or more notches originating at the heel and extending into the block from the tread surface. The notches are rectangular, triangular, trapezoidal or curved in shape. The notches extend in the circumferential direction toward the toe whereby the area of the tread surface has a variable net to gross that increases from the leading edge to the trailing edge of the one or more blocks. The notches have a length ranging from 40% to 70% of the length of the block and a variable width in the circumferential direction with the greatest width being at the heel and ranging from 10% to 30% of the width of the block. The notches also have a variable depth in the radial direction with the depth being greatest at the heel.

The toe of the blocks are sometimes provided with one or more sipes. The sipes have a circumferential orientation and a length equal ranging from 5% to 35% of the length of the block.

BRIEF DESCRIPTION OF THE DRAWINGS

Reference will be made in detail to preferred embodiments of the invention, example of which are illustrated in the accompanying drawings. The drawings are intended to be illustrative, not limiting. Certain elements in selected ones of the drawings may be illustrated not-to-scale, for illustrative clarity.

Often, similar elements throughout the drawings may be referred to by similar references numerals. For example, the element 199 in a figure (or embodiment) may be similar in many respects to the element 299 in an other figure (or embodiment). Such a relationship, if any, between similar elements in different figures or embodiments will become apparent throughout the specification, including, if applicable, in the claims and abstract. In some cases, similar elements may be referred to with similar numbers in a single drawing. For example, a plurality of elements 199 may be referred to as 199a, 199b, 199c, etc.

Figure 1A:
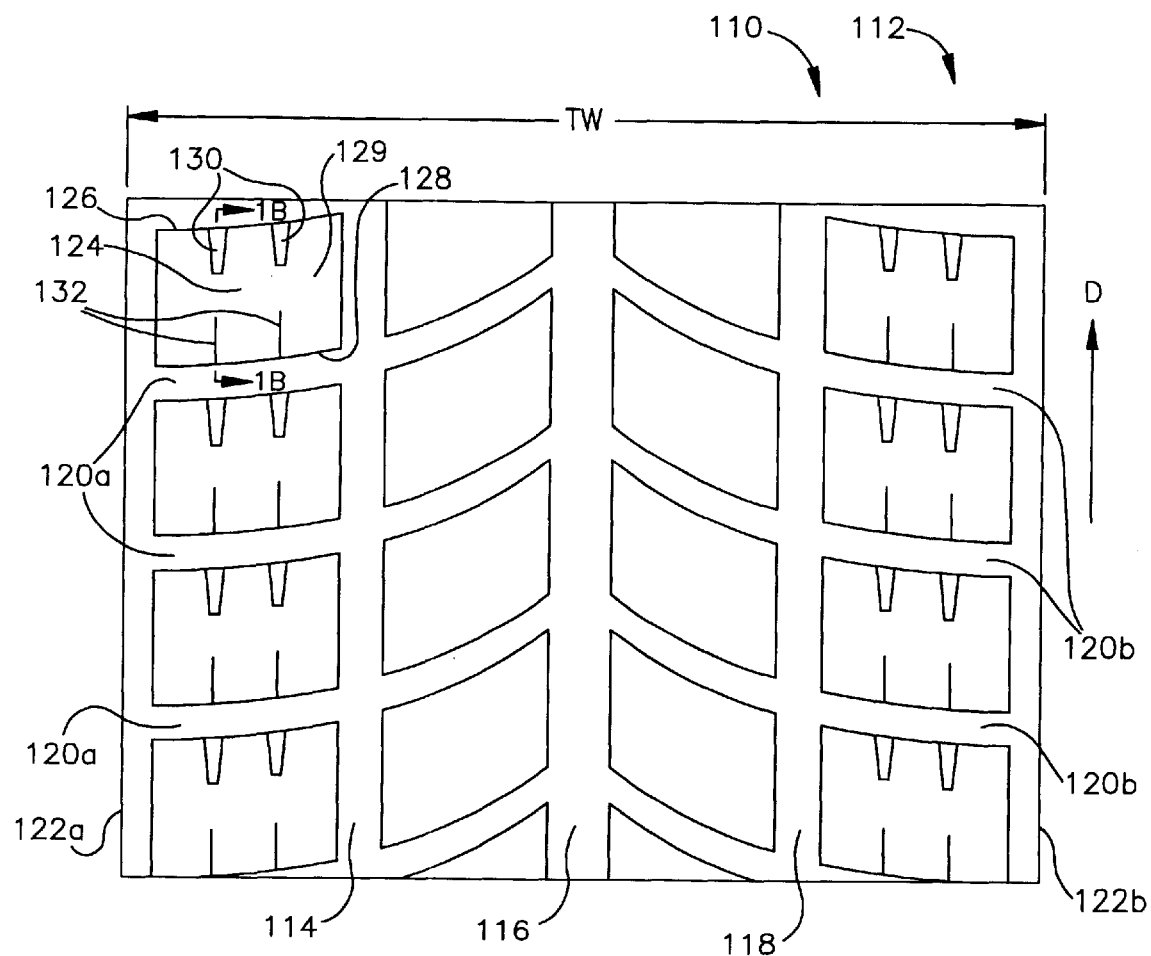

The structure, operation, and advantages of the present preferred embodiment of the invention will become further apparent upon consideration of the following description taken in conjunction with the accompanying drawings, wherein:

FIG. 1A is a developed view showing a tread pattern in accordance with a first embodiment of the present invention.

Figure 1B:
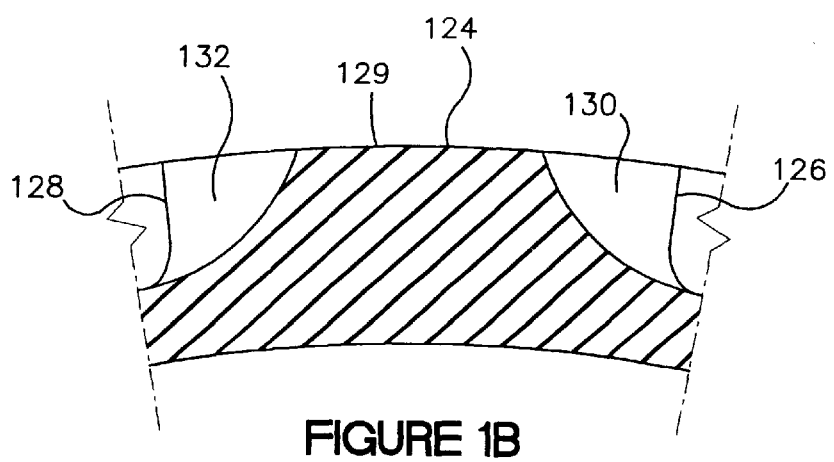

FIG. 1B is a cross-sectional view through a block.

Figure 2:
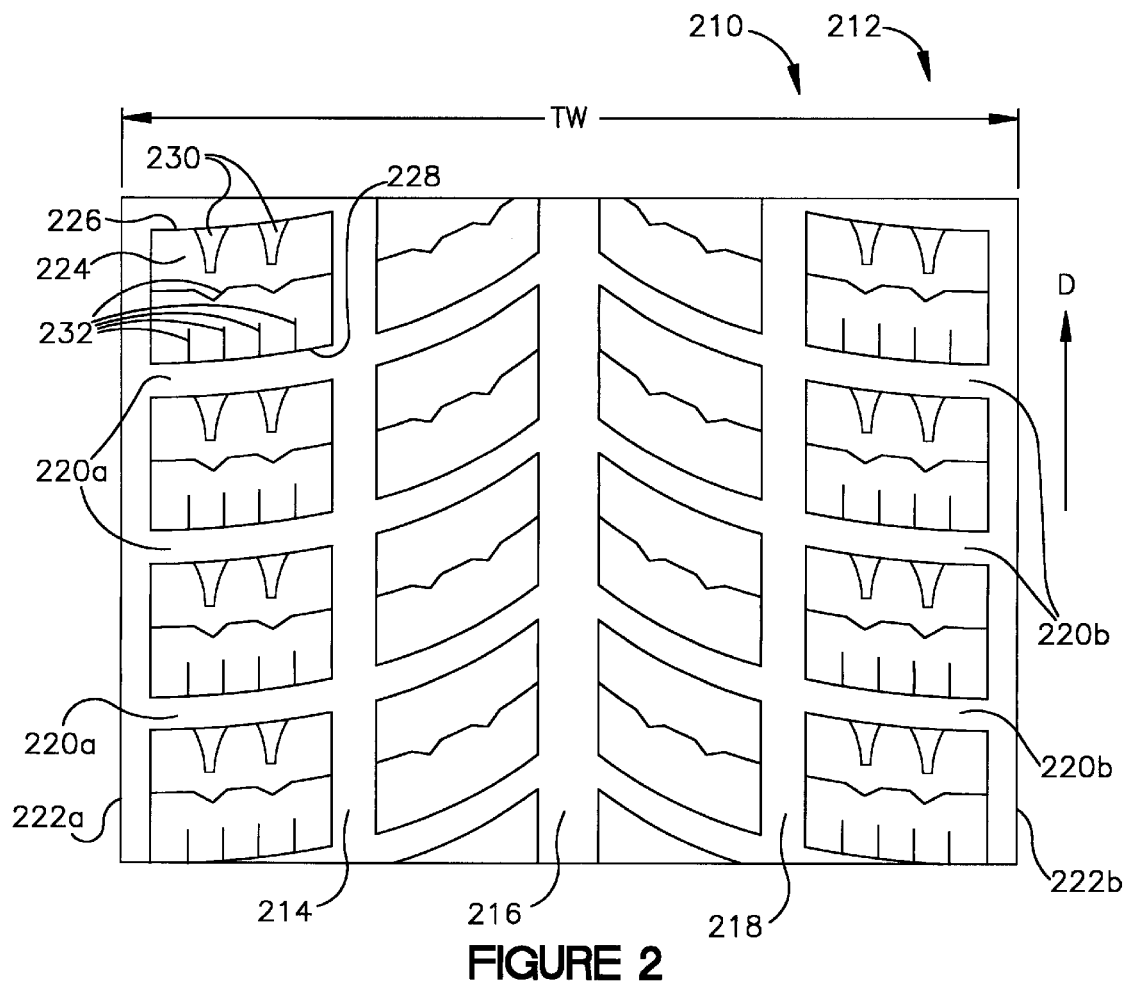

FIG. 2 is a developed view showing a tread pattern in accordance with a second embodiment of the present invention.

DEFINITIONS

"Axial" and "Axially" means the lines or directions that are parallel to the axis of rotation of the tire.

"Axially Inward" means in an axial direction toward the equatorial plane.

"Axially Outward" means in an axial direction away from the equatorial plane.

"Bead" or "Bead Core" generally means that part of the tire comprising an annular tensile member of radially inner beads that are associated with holding the tire to the rim.

"Belt Structure" or "Reinforcement Belts" or "Belt Package" means at least two annular layers or plies of parallel cords, woven or unwoven, underlying the tread, unanchored to the bead, and having both left and right cord angles in the range from 18 degrees to 30 degrees relative to the equatorial plane of the tire.

"Carcass" means the tire structure apart from the belt structure, tread, undertread over the plies, but including the beads.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Directional Tread Pattern" means a tread pattern designed for specific direction of rotation.

"Equatorial Plane" means the plane perpendicular to the tire's axis of rotation and passing through the center of its tread; or the plane containing the circumferential centerline of the tread.

"Footprint" means the contact patch or area of contact of the tire tread with a flat surface under normal load pressure and speed conditions.

"Groove" means an elongated void area in a tread that may extend circumferentially or laterally in the tread in a straight, curved or zigzag manner. It is understood that all groove widths are measured perpendicular to the centerline of the groove.

"Lateral" means a direction going from one sidewall of the tire towards the other sidewall of the tire.

"Net to gross" means the ratio of the net ground contacting tread surface to the gross area of the tread including the ground contacting tread surface and void spaces comprising grooves, notches and sipes.

"Notch" means a void area of limited length that may be used to modify the variation of net to gross void area at the edges of blocks.

"Ply" means a cord-reinforced layer of rubber coated radially deployed or otherwise parallel cords.

"Radial" and "radially" mean directions radially toward or away from the axis of rotation of the tire.

"Radial Ply Tire" means a belted or circumferentially-restricted pneumatic tire in which at least one ply has cords which extend from bead to bead are laid at cord angles between 65 degrees and 90 degrees with respect to the equatorial plane of the tire.

"Shoulder" means the upper portion of sidewall just below the tread edge.

"Sidewall" means that portion of a tire between the tread and the bead.

"Sipe" means a groove having a width in the range of 0.2% to 0.8% of the tread width. Sipes are typically formed by steel blades having a 0.4 to 1.6 mm, inserted into a cast or machined mold.

"Tangential" and "Tangentially" refer to segments of circular curves that intersect at a point through which can be drawn a single line that is mutually tangential to both circular segments.

"Tread" means the ground contacting portion of a tire.

"Tread width" (TW) means the greatest axial distance across the tread, when measured (using a footprint of a tire,) laterally from shoulder to shoulder edge, when mounted on the design rim and subjected to a specified load and when inflated to a specified inflation pressure for said load.

"Void Space" means areas of the tread surface comprising grooves, notches and sipes.

DETAILED DESCRIPTION OF THE PREFERRED EMBODIMENT

It is to be understood that the present invention relates to new tires, retreaded tires, and tire treads in strip form being at least partially vulcanized and having a pattern of grooves and blocks integral therewith.

Referring to FIG. 1A, a first embodiment of the present invention is represented as a developed view showing a partial tread pattern. The tire 110 has a directional tread 112 designed for normal operation in direction of rotation D indicated on the drawing. The tread 112 has three circumferentially extending grooves 114,116,118 having a width ranging between 3% and 8% of the tread width (TW). In the embodiment of the present invention shown in FIG. 1A they have preferably a width of about 6% for the center groove 116 and about 4% for the other grooves 114,118. It is understood that although there are three circumferentially extending grooves 114,116,118 in the illustrated embodiments, the number of circumferential grooves embodying the present invention may vary, for example with the size of the tire 110. Similarly it is understood that although the circumferentially extending grooves 114,116, 118 are straight and parallel, the grooves may vary in direction and width.

As shown by FIG. 1A, a plurality of lateral grooves 120a, 120b extend from center groove 116 to the lateral edges of the tread 122a, 122b. These lateral grooves 120a, 120b follow a curved path having a more or less axial direction at the lateral edge of the tread 122a, 122b with a curvature inclined toward the direction of travel (D) and tending toward a direction more parallel with the equatorial plane of the tire 110 as the grooves extend to the center of the tread. It is understood that although the lateral grooves 120a, 120b are shown inclined and curved in the illustrated embodiments, neither the inclination or the curvature is an essential feature of the present invention. The lateral grooves 120a, 120b have a width ranging between 2% and 6% of the tread width CTW). In the embodiment of the present invention shown in FIG. 1A, they have preferably a width of about 3.5%. It is understood the number of lateral grooves 120a, 120, may vary depending on the size of the tire.

The tread 112 is divided into a plurality of elastomeric blocks 124 by the circumferential grooves 114,116,118 and the plurality of lateral grooves 120a, 120b. The elastomeric blocks 124 are more or less rectangular in shape as defined and separated from each other by the circumferential grooves 114,116,118 and the plurality of lateral grooves 120a, 120b. It is understood that a variety of block shapes can be formed by varying the number, width, curvature and orientation of the circumferential grooves 114,116,118 and the plurality of lateral grooves 120a, 120b. Each block 124 has a width measured in the axial direction and a length measured in the circumferential direction as the distance between the leading edge of the block or heel 126 and trailing edge of the block or toe 128. The blocks 124 have a length ranging from 25% to 100% of their width. In the embodiment of the present invention shown in FIG. 1A the blocks have preferably a length equal to about 50% of their width. During normal operation of the tire 110 in direction opposite to D, as shown on FIG. 1A, the heel 126 of the tread surface 129 of each block contacts the ground first, followed by the toe 128 with each rotation of the tire.

The heel 126 of the blocks 124 is provided with one or more notches 130 extending from tread surface 129. As illustrated by FIG. 1A, only the two rows of blocks 124 nearest the tread edges 122a, 122b are provided with notches 130. However, it is understood that present invention includes the provision of notches 130 originating at the heel 126 of a block 124 regardless of the location of the block in the overall tread pattern. By providing the heel 126 with notches 130, the net to gross at the heel is decreased relative to the net to gross at the toe 128. The net to gross is the ratio of the area of ground contacting elastomeric tread surface 129 to the area of void tread surface comprising grooves or notches 130. In the embodiment of the present invention shown in FIG. 1A, the heel 126 of each block 124 is provided with two trapezoidal shaped notches 130. Each notch 130 has a length in the circumferential direction ranging from 40% to 70% of the length of the block 124. In the embodiment of the present invention shown in FIG. 1A, the each notch 130 has preferably a length equal to about 30% of the length a block. Each notch has a width measured in the axial direction that may vary over its length. In general, the maximum width of a notch 130 is located at heel 126 of a block 124 and becomes progressively narrower in the direction toward the toe 128 of a block, The variation of the width of the notch 130 over its length relative to the heel 126 and toe 128 of the block 124 provide the block with a variable net to gross wherein the net to gross increases from the heel to the toe of the block. It is understood that notches with a variety of shapes and dimension could be applied to the heel of a block to achieve the variation of net to gross. The combined maximum width of the notches 130 measured at the heel 126 of a block 124 ranges from 10% to 30% of the width of the block. In the first embodiment of the present invention shown in FIG. 1A the notches 130 have preferably a maximum combined width equal to about 20% of the width of the block 124.

The toe 128 of a block 124 may be provided with sipes 132 having a circumferential orientation and a length equal ranging from 5% to 35% of the length of the block. In the embodiment of the present invention shown in FIG. 1A, each block 124 that is adjacent to a tread edges 122a, 122b is provided with two sipes 132, each sipe having a length of about 30% of the length of each block. However it is understood that the present invention includes the provision of sipes in the toe 128 of a block 124 regardless of location of the block.

FIG. 1B shows a cross-sectional view of a typical block 124 of the tread 112 of the first embodiment of the present invention as illustrated by FIG. 1A. As shown by FIG. 1B, the notch 130 has a depth measured in the radial direction that varies with its length in a circumferential direction. As shown by FIG. 1B the notch 130 has a maximum depth at the heel 126 of the block 124 that is about equal to the depth of the adjacent lateral grooves 120a or 120b, the depth being measured radially inward from the ground contacting surface of the tread. The depth of the notch 130 is gradually reduced from its maximum depth at the heel 126 of the block 124 following a gradual curve to a minimum depth at the end of the notch nearest to the toe 128 of the block. FIG. 1B also shows one of the sipes 132, having a depth that varies over its length with a maximum depth at the toe 128 of the block 124. Generally a sipe 132 can have a depth equal to or less than the nominal depth of the tread.

Referring now to FIG. 2 a second embodiment of the present invention is illustrated. The features of the embodiment of FIG. 2 are substantially similar to those illustrated for the first embodiment of FIGS. 1A and 1B, the difference being that in the embodiment shown in FIG. 2, the blocks 224 are provided with notches 230 having curved sides. Also, the blocks 224 are provided with a sipe 232 extending between the lateral edges 225a, 225b of each block and with four sipes 232 having a circumferential orientation located in the toe 228 of each block 224. The sipes 232 located in the toe 228 of the block 224 increase the lateral flexibility of the of the block in the area of the toe. Such an increase in lateral flexibility allows the block toe 228 to comply with lateral forces with less slippage and reduced wear. Such an embodiment is believed to provide a reduced heel and toe wear differential as well as a more uniform distribution of heel-toe wear.

Dynamic Operation of the Inventive Concept

The dynamic operation of the inventive concept is described relative to the details of the first embodiment. However the basic principles of operation and the essential results are equivalent for the two embodiments described above as well as for a range of applications that could vary considerably in detail but not the spirit of the present invention. One skilled in the art will find no difficulty in applying the following discussion to both embodiments as well as to a variety of easily conceived alternatives.

It is known that the leading edge or heel 126 and the trailing edge or toe 128 of the blocks 124 that make up a block-type tread 112 patterns are subject to differing rates of wear in normal use. In general, the rate of wear at the toe 126 of the blocks 124 exceeds the rate of wear at the heel 128. This differential pattern of wear in tires with conventional block tread patterns results in a tire having an irregular ground contacting tread surface 129 that increases the noise generated by the tire in normal operation. Providing the block heels 126 with notches 130 reduces the surface area of elastomeric material in the vicinity of the heel causing the rate of wear in the heel area to be increased to a rate that equals the rate of wear at the toe 128 of the blocks 124. In addition, providing the toe 128 with sipes 132 increases the lateral flexibility of block in the toe area where such flexibility reduces lateral forces and slippage which are a cause of the increased rate of wear in the area of toe. By balancing the rate of wear at the heel 126 and toe 128 of the blocks 124, the uniformity of the ground contacting surface 129 of the tread 112 is maintained over the life of the tire 110 with a reduction in vibration and noise as compared to convention block tread patterns.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. A pneumatic tire comprising a directional tread having blocks, each block having a leading edge or heel and a trailing edge or toe extending from a ground contacting tread surface, one or more of the blocks being characterized by a plurality of notches originating at the heel and extending into the block from the tread surface, the notches extending in the circumferential direction toward the toe wherein the area of the tread surface has a variable net to gross that increases from the leading edge to the trailing edge of the one or more blocks, the blocks being defined by a plurality of circumferentially extending grooves and a plurality of inclined lateral grooves so as to define the directional tread; and each notch has a length measured in the circumferential direction ranging from 40% to 70% of the length of the block.

2. The tire of claim 1 characterized in that each notch has a width measured at the heel ranging from 10% to 30% of the width of the block.

3. The tire of claim 1 characterized in that the notches are rectangular, triangular, trapezoidal or curved in shape.

4. The tire of claim 1 characterized in that the notches have a variable width in the circumferential direction, the width being greatest at the heel.

5. The tire of claim 1 characterized in that the notches have a variable depth in the circumferential direction, the depth being greatest at the heel.

6. The tire of claim 1 characterized in that the toe of one or more blocks are provided with one or more sipes.

7. The tire of claim 6 characterized in that the sipes have a circumferential orientation and a length equal ranging from 5% to 35% of the length of the block.

8. The tire of claim 1, characterized in that:

the tread has two edges;

the blocks are arranged in circumferentially-extending rows; and only rows of blocks nearest the tread edges are provided with notches.

9. The tire of claim 1, characterized in that:

there are two notches; and a combined width of the two notches is 10–30% of the block width, at the leading edge of the block.

10. The tire of claim 1, characterized in that:

a block has a length measured in the circumferential direction, and a width measured in the axial direction; and the length is 25–100% of the width.

11. The tire of claim 10, characterized in that:

each block has a length measured in the circumferential direction, and a width measured in the axial direction; and the length is about 50% of the width.

\* \* \* \* \*